United States Patent [19]

Acharya et al.

[11] Patent Number: 4,852,358
[45] Date of Patent: Aug. 1, 1989

[54] CRYOGENIC COMBINATION TUNNEL FREEZER

[75] Inventors: Arun Acharya, East Amherst; Jeffert J. Nowobilski, Orchard Park, both of N.Y.

[73] Assignee: Union Carbide Corporation, Danbury, Conn.

[21] Appl. No.: 219,666

[22] Filed: Jul. 16, 1988

[51] Int. Cl.$^4$ .............................................. F25D 13/06
[52] U.S. Cl. .......................................... 62/63; 62/374; 62/380
[58] Field of Search ............................ 62/374, 380, 63

[56] References Cited

U.S. PATENT DOCUMENTS

| | | | |
|---|---|---|---|
| 3,298,188 | 1/1967 | Webster et al. | 62/63 |
| 3,376,710 | 4/1968 | Hirtensteiner | 62/380 |
| 3,413,818 | 12/1968 | Pelmulder | 62/63 |
| 3,427,820 | 1/1969 | Hart | 62/307 |
| 3,440,831 | 4/1969 | Thompson | 62/63 |
| 3,485,055 | 12/1969 | Webster et al. | 62/63 |
| 4,075,869 | 2/1978 | Fitsall | 62/374 |
| 4,229,947 | 10/1980 | Klee | 62/380 |
| 4,403,479 | 9/1983 | Rasovich | 62/63 |
| 4,475,351 | 10/1984 | Klee | 62/63 |
| 4,517,814 | 5/1985 | Rothstein | 62/374 |
| 4,589,264 | 5/1986 | Astrom | 62/374 |

OTHER PUBLICATIONS

Koach Engineering and Manufacturing Inc., Sun Valley, Calif., Undated Brochure.

Primary Examiner—Ronald C. Capossela
Attorney, Agent, or Firm—Shirley L. Church; Stanley Ktorides

[57] ABSTRACT

The present invention comprises a method and apparatus to be used in the cryogenic fast freezing of organic comprised articles such a biologicals and foodstuffs. The method enables control of the time-temperature profile of an article as it progresses through the freezing process, and thus provides the highest quality frozen article. The method requires at least two applications of liquid cryogen to the surface of the article during the freezing process, wherein the applications of liquid cryogen are spaced in time in a manner which essentially prevents thermal cracking and embrittlement of portions of the article, while simultaneously ensuring that a frozen crust which operates as a barrier to water conduction or transmission out of the article remains on the articles throughout the freezing process. In addition, the method and apparatus provide an improved efficiency of operation in terms of utilization of the cryogenic medium within the freezing process.

12 Claims, 6 Drawing Sheets

CRYOGENIC COMBINATION TUNNEL FREEZER

BACKGROUND OF THE INVENTION

1. Field of the Invention

This invention pertains to a cryogenic system for freezing articles such as biologicals and foodstuffs. The system comprises a method and apparatus which represent an improvement over previous art in that the method enables close control of the time-temperature profile of the organic comprising article, in an efficient manner, during freezing and in that the apparatus facilitates the time-temperature profile control while enabling the freezing of a variety of different articles selectively by changing the allocation of liquid cryogen to various locations within the apparatus.

2. Background Art

The freezing of foodstuffs and biologicals requires careful consideration of the physical changes which occur in the material when it is frozen. Many biological or foodstuff materials must be frozen very rapidly to prevent the growth of damaging crystal formations which can break the cell structure of the material, resulting in destruction of the biological activity or food structure and taste characteristics. Rapid freezing is frequently obtained by direct immersion of the articles to be frozen in a cryogenic liquid. However, to economically freeze articles such as biologicals or foodstuffs using a cryogenic media, it is necessary to achieve a high degree of efficiency in use of the cryogenic media. Typically it is too expensive to completely freeze a foodstuff article solely by immersion in a cryogenic liquid. Numerous combinations of cryogenic media, including both the liquid cryogen and gaseous cryogen produced upon boiling of the liquid cryogen, have been used in attempts to obtain a high degree of efficiency.

Examples of commercially available freezing systems are those disclosed by Koach Engineering and Manufacturing Inc., Sun Valley, Calif. in undated brochures. One typical system described in a brochure comprises a liquid nitrogen immersion vaporizing system to provide fast freezing of food products. The food product is first immersed in liquid nitrogen at $-320°$ F. ($-196°$ C.) to form a frozen crust and seal the surface of the article of food. The immersion is followed by a cocurrent exposure to cold nitrogen vapor generated by the immersion freezer, to finish the task of completely freezing the article of food. Another system described in the brochure comprises three cooling zones, a "precooling zone" which uses cold nitrogen vapor, a "spray zone" wherein droplets of liquid nitrogen are applied to the food product upper surface, and a "postcooling zone" wherein cold nitrogen vapor is used to bring the product to a uniform temperature throughout.

U.S. Pat. No. 3,298,188, dated Jan. 17, 1967, to R. C. Webster, et al. describes a method and apparatus for freezing food products, including a system for diverting the cryogenic media after utilization as a liquid for further use as a vapor, to economically utilize the cryogenic media. The apparatus is designed so the food product to be frozen moves progressively up an incline as it moves through the freezer. Near the top of the incline is a spray header for spraying liquid nitrogen upon the food articles being cooled. The vapors produced at the spray header of cryogenic liquid are directed down the incline from which the food product is entering, pre-cooling the articles of food prior to their contact with the liquid nitrogen spray. Fans and baffles are used in combination with the incline to make efficient use of the pre cooling cryogen vapors flowing down the incline. In one embodiment of the invention, a liquid nitrogen bath for immersion of the food product immediately follows the spray header, to provide additional cooling.

U.S. Pat. No. 3,376,710, dated Apr. 9, 1968, to W. E. Hirtensteiner describes a food freezing apparatus for low temperature freezing of food products. The first state of the freezer comprises a direct contacting state wherein the food product is directly contacted with a liquid cryogen such as liquid nitrogen. Cold gaseous nitrogen, evolved from the first, direct contacting stage, is conveyed through a second stage of the freezer which comprises an elongated chamber where the cold, gaseous nitrogen is repeatedly circulated against the product at successive locations along and transversely of the path of advancement of the food product; the gaseous nitrogen is locally circulated and maintained at such locations (allowing relatively small net flow rate through the chamber) (Col. 1, lines 52-52). The local circulation of gaseous nitrogen is accomplished using mechanical means, a fan and baffle arrangement, in the second cooling stage of the apparatus, as shown in the drawings.

U.S. Pat. No. 3,413,818, dated Dec. 3, 1968, to J. P. Pelmulder discloses a very intricate and complex system for quick freezing of delicate cellular products. The system described includes apparatus for precooling, immersion, tempering, and postcooling of food products and biologicals. The food product is precooled in cold gas evolved from a liquid nitrogen immersion bath which follows the pre-cooling area. The food product is then immersed in the liquid nitrogen bath to form a frozen crust on the product. Subsequently, the food product is tempered in a static bath of cold nitrogen gas also evolved from the liquid bath, and finally the food product is passed countercurrent to a dynamic stream of cold nitrogen gas to further deepen the frozen crust so the product will freeze solid upon removal from the dynamic stream of gas. Air locks are used to maintain nitrogen gas pressures within the precooling and postcooling areas of the apparatus.

U.S. Pat. No. 3,427,820, dated Feb. 18, 1969, to J. Hart, discloses a food flash freezing machine comprising a tunnel structure having a conveyor belt upon which food to be frozen is moved through the tunnel. The freezing machine typically comprising a pre-cool zone through which cold gas flows, contacting the food entering the tunnel on the conveyor belt; a freezing section having means above the food conveyor belt to spray food advancing therein with a cold boiling liquid, said freezing section in communication with the pre-cool zone; and various means to draw off cold gas evolved in the tunnel structure freezing zone and to return the cold gas to other portions of the tunnel such as the pre-cool zone. Some of the machine embodiments described do not require a pre-cool zone.

U.S. Pat. No. 3,440,831 dated Apr. 29, 1969, to S. S. Thompson describes an immersion quick freeze process whereby metal parts, food items, and other such liquid immersible bodies are quick frozen to a given temperature by contacting liquid nitrogen at an expansion pressure, with a secondary refrigerant such as alcohol which is a liquid at the aforesaid temperature, to lower the temperature of the secondary refrigerant followed by immersion of the body or bodies in the secondary refrigerant while it is at the reduced temperature. More than one bath of the secondary refrigerant may be used, beginning with a warmer bath and progressing toward lower temperature baths, when it is desired to subject the body to be immersed to a more gradual temperature change.

U.S. Pat. No. 3,485,055, dated Dec. 23, 1969, to R. C. Webster, et al. discloses a continuous conveyor type cryogenic freezing apparatus for freezing food products. The product to be frozen passes in sequence through pre-cooling, liquid immersion, tempering and post-cooling zones to provide effective utilization of the cooling effect of the cryogen.

U.S. Pat. No. 4,075,869, dated Feb. 28, 1978, to R. A. Fitsall discloses an apparatus for cooling or freezing articles in which the articles are moved through a tunnel and are contacted successively by a vaporized cryogenic medium and a liquid cryogenic medium. Jets of pressurized gas are introduced into the gas contacting zone to cause turbulence in flow of vaporized cryogenic medium passing through that zone.

U.S. Pat. No. 4,229,947, dated Oct. 28, 1980, to D. J. Klee, describes a cryogenic freezer utilizing a single, centrally located blower which circulates a cryogenic refrigerant through a pair of high velocity, minimum size product contact chambers. The product contact chambers may be of variable cross section, so as to reduce the amount of refrigerant gas which must be circulated and maximize the velocity of the refrigerant to increase heat transfer.

U.S. Pat. No. 4,403,479, dated Sept. 13, 1983, to I. Rasovich discloses an apparatus for quick freezing food products including a liquid nitrogen immersion bath followed by an adjacent chamber which provides additional cooling by vapor from the liquid bath which has been drawn into the chamber. The vapor in the chamber flows cocurrently with the food product as it progresses through the apparatus. Transverse baffles are used in the chamber both above and below the conveyor belt which transports the food product through the chamber; the baffles serve to divide the tunnel into temperature zones and to direct the nitrogen vapor downward and upward over the product. The baffles are pivoted to permit product on the belt to pass the baffles.

U.S. Pat. No. 4,475,351, dated Oct. 9, 1984, to D. J. Klee describes a dual flow cryogenic tunnel freezer. The freezer comprises a plurality of individual cooling zones, each equipped with a radial fan rotating in a horizontal plane. Cryogenic liquid refrigerant is sprayed into at least one of the cooling zones in the central region of the tunnel, upwardly into the rotating fans. The vaporized refrigerant flows from the supercold zone of liquid introduction beneath the edges of partitions which separate the individual cooling zones, outwardly towards the opposite ends of the tunnel in substantially equal amounts. The vaporized refrigerant flows generally countercurrent to the incoming product to be frozen and cocurrent to the product moving toward the freezer exit.

U.S. Pat. No. 4,517,814, dated May 21, 1985, to S. O. Rothstein discloses an apparatus for continuous direct treatment of products by means of a fluid cooling medium. The apparatus comprises a chamber having means to form a liquid bed to effect direct treatment of the products in liquid cryogen contained in the bed. The liquid bed is formed by a supporting surface beneath the bed, and sidewall surfaces at opposite sides of the bed. The supporting surface has openings through which vertically directed curtains of the liquid cryogen, preferably liquid nitrogen, are emitted to create the liquid bed. The curtains are positioned at ends of the bed for retaining the bed therebetween. Nitrogen vapors formed by evaporation of the liquid nitrogen from the bath can be used for pre cooling the food product prior to immersion in the liquid bed or can be used for post-cooling in the mechanical freezer which follows the cryogenic liquid bed of the apparatus.

U S. Pat. No. 4,589,264, dated May 20, 1986, to S. Astrom discloses a tunnel freezer having a pre-cooling section and a section in which the product to be frozen is sprayed with a cryogenic liquid prior to exiting the tunnel. The freezer utilizes specially designed fans having paddle wheels, the fans being driven by a chain or belt transmission. Moreover, the tunnel is divided into compartments by partitions, to balance the flow of gaseous cryogen within the freezer. The partitions are curtains which are made of a flexible material.

Many of the above disclosures comprise known individual process steps or known individual elements of an apparatus, but in each case the combination of steps making up the overall process or method, or the combination of elements making up the total apparatus differs. In nearly all cases, the goal is to provide a more efficient method for freezing articles comprising organic contents while simultaneously preventing the formation of harmful crystal formations which would damage the structure or composition of the article being frozen, while simultaneously preventing a substantial loss of moisture which affects structure or composition of the article.

The known art provides methods of fast freezing foodstuffs, but does not provide a relatively simple and inexpensive but efficient method for controlling the temperature profile of the foodstuff during freezing, as is necessary to ensure the quality of the frozen foodstuff. For example, one of the recommended methods of fast freezing foodstuff articles is to crust freeze the article by spraying or immersing the article in liquid cryogen. Often, when the foodstuff article is not symmetrical in shape, portions of the article which are smaller in cross sectional area become brittle during crust freezing and are subject to fracture and separation from the main body of the article during handling. In addition, even when the foodstuff is symmetrical in shape, the depth of crust freezing of the foodstuff must be carefully controlled to prevent thermal cracking of the foodstuff. Since, for commonly used cryogens, at least about one half of the capacity of the liquid cryogen to remove heat from the article being frozen is available on boiling of the liquid cryogen as it contacts the foodstuff, economics demand that the depth of crust freezing during contact with the liquid cryogen be determined by the need to obtain maximum utilization of the liquid cryogen. It would, then, be advantageous to have a method and apparatus which enable not only making efficient use of the cooling capacity of the liquid and gaseous cryogen, but which also enable careful control of the crust freezing and overall time temperature profile of the article during freezing, thus ensuring the quality of the frozen article.

SUMMARY OF THE INVENTION

The method of the present invention comprises the use of liquid cryogen applied to the article to be frozen in a manner which ensures that substantially the total surface of the article is rapidly and relatively evenly cooled, and which application is time spaced within the freezing process so that a controlled temperature profile of the article is achieved throughout the freezing process and the cryogen is more effectively employed. By using the method of the present invention, the degree of temperature disparity over the cross-sectional profile of the article is reduced. It has been found that in order to accomplish acceptable control over the temperature profile of the article, it is necessary to have at least two applications of liquid cryogen to the article to be frozen, with the tow applications time spaced in a manner such that an acceptable time-temperature profile is achieved while a frozen crust is maintained on the article as the article is being frozen throughout. It is preferred that the first application of liquid cryogen to the article take place prior to the loss of any substantial amount of moisture from the article to be frozen; thus, the first application of liquid cryogen must be immediately upon entry of the article into the freezin g apparatus, or shortly thereafter. The exact point of application depends on the kind of article being frozen and the temperature of the article as it enters the freezer. An article entering the freezer at a temperature above about 40° F. (4° C.) may require some pre cooling by cryogen vapor or other means prior to application of liquid cryogen to the surface of the article. However, such preliminary cooling must be limited to prevent dehydration of the article to be frozen.

The present invention includes a method of controlling the time-temperature profile of an organic comprised article during freezing in a cryogenic freezer, the method comprising:

(a) contacting at least a portion of the surface of an organic comprised article to be frozen with a liquid cryogen to form a frozen crust on the surface of the article, wherein the thickness of the crust formed is sufficient to permit transfer of a substantial amount of heat from within the interior of the article while maintaining at least a portion of the frozen crust adequate to act as a water transmission barrier, and wherein the thickness of the crust formed is limited to essentially prevent thermal fracture of the article and such that portions of the article having cross-sections which are relatively small compared with the largest cross-sectional dimension of the article do not become brittle and subject to significant fracture and damage due to handling during the freezing of the article;

(b) removing the article from contact with the liquid cryogen for a residence time period sufficient to permit heat transfer from the interior of the article, while at the same time maintaining at least a portion of the frozen crust on the surface of the article adequate to function as a water transmission barrier; and, (c) repeating step (a) at least once subsequent to step (b) during the freezing of the article.

More efficient use of the cryogen is made by contacting the article with vapor cryogen during step (b). Contact with the vapor cryogen also assists in maintaining the frozen surface crust on the article during the residence time period.

The method of contact between the liquid cryogen and the organic comprised article can be by immersion of the article in a liquid cryogen bath, by applying a spray of liquid cryogen to the article, or combinations thereof. It is important to have the method of contact provide as uniform cooling over the surface of the article as possible. It is preferred that the first contact between the liquid cryogen and the organic comprised article be by immersion, since immersion provides the most uniform formation of a frozen crust on the surface of the article.

To fully utilize the cooling capacity of the cryogen media, cryogen vapor (typically generated upon boiling of the liquid cryogen as it contacts the article surface) is used at locations within the cryogenic freezer to cool the article and to assist in the total freezing of the article. For example, cryogen vapor can be contacted with the articles to be frozen prior to step (a) to provide precooling and is preferably contacted with the articles being frozen during step (b) of the method (during the residence time period when the articles are not in contact with the liquid cryogen). Contacting the article with cryogen vapor during this time period not only assists in the overall cooling of the article, but also helps prevent the frozen crust from thawing during the heat transfer period.

The apparatus of the present invention, used to facilitate the method described above, comprises:

(a) a tunnel shaped enclosure within which the organic comprised articles are frozen;

(b) at least one means for conveying the organic comprised articles through the tunnel-shaped enclosure;

(c) at least two means for contacting the organic comprised articles with liquid cryogen, wherein the first one of the at least two means is positioned so that the organic comprised articles contact the liquid cryogen prior to being subjected to cryogenic vapors in an amount sufficient to cause dehydration of the organic comprised articles; and, (d) at least one means within the tunnel shaped enclosure for providing substantial residence time within the tunnel-shaped enclosure during which the organic comprised articles are not in contact with liquid cryogen and during which heat transfer from the interior of the article toward the surface of the article can occur, the means for providing such substantial residence time being interdisposed between two of the at least two means for contacting the organic comprised articles with liquid cryogen.

The step (d) means for providing substantial residence time is preferably constructed to provide for the flow of cryogen vapors over the article during the residence time period. The direction of flowing vapors can be cocurrent or countercurrent to the direction in which the article is moving, with countercurrent flow of vapors being preferred and serpantine countercurrent flow of vapors being most preferred.

The desired amount of contact time with liquid cryogen at each liquid cryogen contacting means, and the amount of residence time at each substantial residence time means within the tunnel-shaped freezer can be approximated using calculation methods commonly known in the art heat transfer art. Use of a computer to simulate the time-temperature profile of the article to be frozen, depending on the elements comprising the freezer apparatus and the incoming temperature of and composition of the article to be frozen, is helpful in determining the conditions under which the freezer is to be operated. Minimal experimentation is necessary to establish the optimum conditions for operation of the freezer.

DEFINITIONS

An instantaneous, cross-sectional temperature profile, as used in the specification and claims herein, means the temperature profile at a given cross-sectional location within the article being frozen at a particular point in the time progression of the article through the freezing process. The instantaneous time temperature profile of the entire article shows the temperature at each location within the article at a point in time. The complete time-temperature profile for the entire article would show the changes in temperature at each location within the article as the article progresses through the freezing process, until the article is frozen throughout.

Crust freezing of an article, as used in the specification and claims herein, means lowering of the surface temperature of the article so that a change in physical structure occurs at the surface of the article, providing a layer or crust of altered physical structure, such as a crust comprised substantially of frozen liquid, e.g., ice, capable of acting as a barrier to the conduction or transmission of water out of the bulk of the article (through the body to the surface from which water can escape as a vapor). The crust of altered physical structure often provides surface structural integrity for articles which otherwise have a soft or friable surface which would be subject to damage during handling.

A liquid cryogen, as used in the specification and claims herein, means a liquid refrigerant having a normal boiling point below about 0° F. (−18° C.). Examples of liquid cryogens include liquid nitrogen, liquid air, liquid nitrous oxide, liquid carbon dioxide and liquid halogenated hydrocarbons.

An organic comprised article, as used in the specification and claims herein, means an article comprised of compounds of carbon, and illustratively biological materials such as medical compositions and drugs, and foodstuffs such as fruits, vegetables, meats, fish, poultry, and processed food products.

DETAILED DESCRIPTION OF THE PREFERRED EMBODIMENTS

The method of the present invention comprises the application of liquid cryogen to an article to be frozen in a manner which ensures that substantially the total outer surface of the article is rapidly and evenly cooled while simultaneously providing a frozen layer or crust of controlled thickness on such outer surface of the article. Control of the thickness of the frozen crust on the article prevents embrittlement of portions of the article which have a cross-sectional area which is relatively small in comparison with the largest cross-sectional area of the article; as a consequence, such portions are not subject to breakage and damage caused by handling durin g the overall freezing process. Control of the thickness of the frozen crust on the article outer surface also provides control over the amount of thermal cracking and dehydration of the article, both of which are critical to producing a quality frozen article.

Since at least about one half of the heat removal capability of the liquid cryogen is consumed upon boiling of commonly used liquid cryogens, with the remainder available as the temperature of the liquid cryogen rises from its boiling temperature to about 0° C., it is necessary to achieve at least one half of the cooling of the article upon contact of the article with the liquid cryogen. In the case of liquid nitrogen as the cryogen, the preferred liquid cryogen of the present invention, about one half of the heat removal capability of the liquid cryogen is available upon boiling of the liquid nitrogen; in the case of liquid cryogens boiling at higher temperatures, an increased amount of the heat removal capability occurs during boiling of the liquid cryogen. Previously disclosed methods of cryogenic freezing generally provide for a continuous exposure of the article to liquid cryogen (such as a single immersion), followed by exposure to cryogenic vapor prior to exit of the article to be frozen from the freezer. This requires that at least about one half of the heat transfer out of the article occur in this single, continuous exposure to liquid cryogen if the freezing method is to be thermally efficient. However, removal of at least one half of the heat in a continuous exposure to liquid cryogen requires that the depth of frozen crust on the article undergoing freezing be substantial; this can result in the previously described undesirable thermal fracture or the embrittlement of portions of articles.

It has been discovered that by using more than one contact of the article with liquid cryogen, with a time period occurring between contact periods, it is possible to control the depth of crust freezing of the article while simultaneously taking advantage of the maximum cooling capacity which can be obtained upon boiling of the cryogenic liquid as it contacts the article to be frozen. Thus, the method of the present invention requires the article to be frozen be contacted with a cryogenic liquid at least two times during the freezing process. The preferred method of the present invention requires that the first contact of the article with liquid cryogen be by immersion of the article, since immersion provides more uniform cooling of the entire article surface. In addition, the method most preferred requires that the first contact immersion occur prior to any substantial amount of pre-cooling so that the article is not significantly dehydrated prior to the initial crust freezing. The amount of pre-cooling permitted depends on the shape and composition of the article being frozen and the incoming temperature of the article as it enters the process.

The method of the present invention is not limited to applications wherein the liquid cryogen is applied by an immersion step. It is possible to use a spray application of liquid cryogen to the article, or spray-immersion application combinations as well. In terms of capital equipment expense a liquid cryogen immersion/residence time/liquid cryogen spray freezer design is preferred. In terms of operational efficiency, a liquid cryogen immersion/residence time/liquid cryogen immersion freezer design is preferred.

Figure 1:
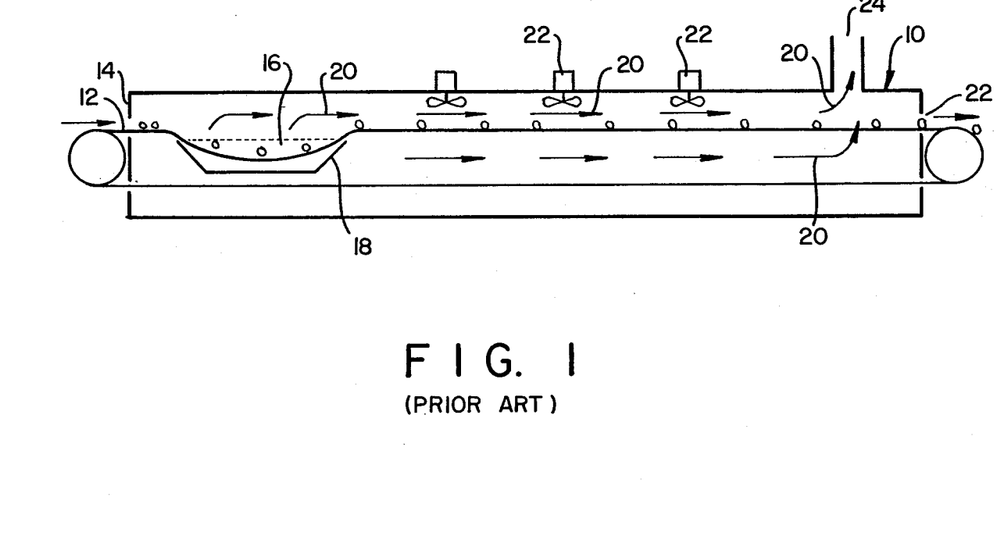
FIG. 1 shows one kind of prior art conventional cryogenic tunnel freezer, side view, wherein the article to be frozen is immersed in a cryogenic liquid and then exposed to cocurrent flow of cryogen vapors prior to exiting the freezer.

As shown in FIG. 1, which is representative of present conventional freezer tunnel systems, it is known to immerse the article to be frozen in liquid cryogen, followed by exposure of the article to cryogen vapors prior to exiting the freezer. The article to be frozen travels through the freezer 10 on a product conveyor belt 12. The articles to be frozen pass through a vertical sliding door 14, which is adjusted to provide the size opening required by the articles being processed. The articles are then contacted with liquid cryogen 16 in an immersion bath 18. Subsequently, the articles are exposed to cocurrently flowing cryogen vapors 20 which are generated by boiling of liquid cryogen 16 upon contact with the articles being processed in immersion bath 18. The cryogen vapors may be circulated using fans 22 spaced above conveyor belt 12 toward exit 22. Cryogen vapors are removed from the freezer through conduit 24. The time period the articles are exposed to cryogen vapors 20 is sufficient to permit the temperature of the articles to reach the desired temperature throughout (for example, 0° F.). This process has the disadvantage that at least one half of the cooling of the article must occur in immersion bath 18 if the process is to be thermally efficient. Thus, a thick crust freezing typically occurs which often results in thermal stress cracking of the product being frozen and embrittlement of small crossectional portions of the article. In addition, the location and directional flow of the fans results in backmixing of the cryogen vapors along the flow path of the food as it moves through the freezer, and thus does not provide the optimized heat transfer differential temperatures which would provide the most efficient cooling.

The method of the present invention comprises the use of at least two applications of liquid cryogen, wherein the applications are spaced in time to permit substantial temperature equalization of the article being frozen between each application. The use of at least two applications of liquid cryogen avoids the necessity of forming a thick layer of crust freezing which typically causes the thermal fracture and embrittlement of portions of the article being frozen, as previously discussed. In addition use of at least two applications of liquid cryogen permits maintenance of a greater delta temperature ($\Delta T$) between the article being frozen and cryogenic vapors to which the article is exposed during equalization residence times, providing a more efficient overall heat transfer profile for the freezer. This technique of liquid cryogen application not only permits a more controlled time temperature profile of the article as it freezes, but permits the freezer to be used to process a number of different kinds of articles by simply adjusting the amount of liquid cryogen applied to the article at a particular application location.

Figure 2:
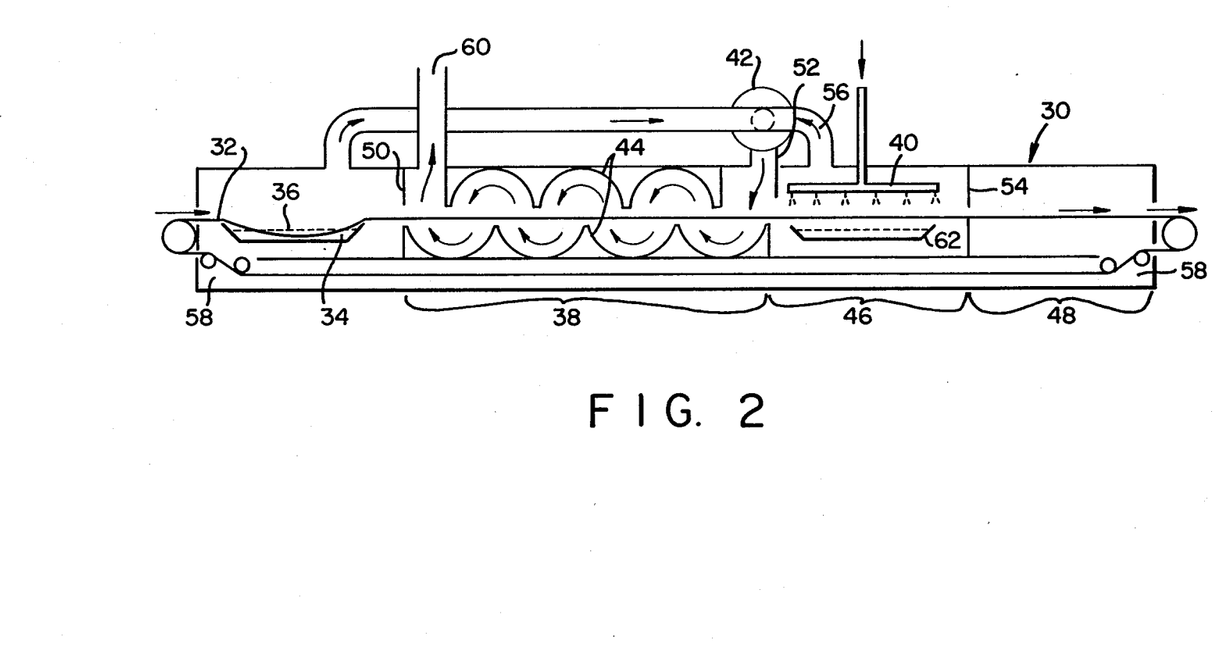
FIG. 2 shows one of the embodiments of the present invention, an advanced cryogenic combination tunnel freezer, wherein the article to be frozen is immersed in a cryogenic liquid, then exposed at least to at least one means of cryogen vapor flow for a substantial residence time period, followed by a second exposure to liquid cryogen in the form of a spray.

FIG. 2 shows one preferred embodiment of the present invention, wherein the article to be frozen is first immersed in a liquid cryogen bath 34, followed by exposure to countercurrently flowing cryogen vapors during a temperature equalization residence time, followed by contact of the articles with a spray of liquid cryogen. The articles to be frozen enter the freezer 30 on conveyor belt 32 and are passed into a first immersion bath 34 of liquid cryogen 36 within a short time period of entering freezer 30. The length of time the articles spend on conveyor 32 prior to entering immersion bath 34 depends on the amount of pre-cooling desired prior to immersion in bath 34. Typically the amount of pre-cooling is minimal and depends on the kind of article being frozen and the temperature of the article as it enters freezer 30. For example, foodstuffs such as uncooked meats and vegetables at temperatures of about 40° F. (4° C.) or less are typically immersed in immersion bath 34 immediately upon entry to the freezer. Foodstuffs such as uncooked vegetables at temperatures of about 70° F. (20° C.) are pre-cooled to about 40° F. prior to immersion. Precooked meats such as sausages can be directly immersed into bath 34 at temperatures as high as about 130° F. (54° C.). One skilled in the art can, with minimal experimentation determine whether pre-cooling is advantageous or necessary in terms of quality of the finished frozen product.

Figure 3:
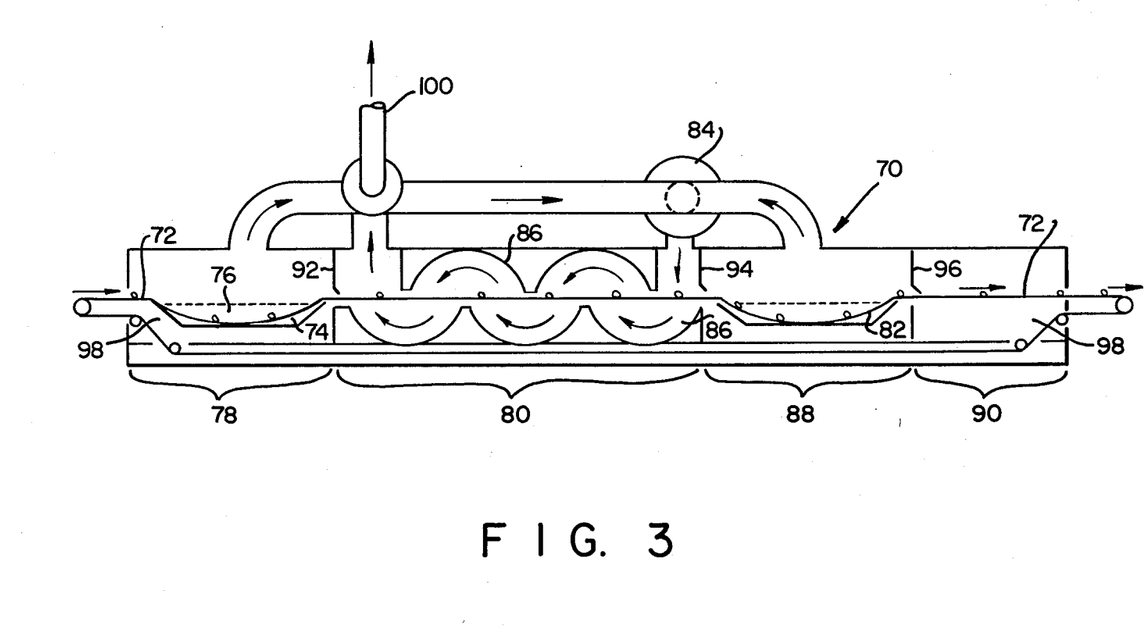
FIG. 3 shows a second embodiment of the present invention, an advanced cryogenic combination tunnel freezer, wherein the article to be frozen is immersed in a cryogenic liquid, then exposed at least to at least one means of cryogen vapor flow for a substantial residence time period, followed by a second immersion in liquid cryogen.

Subsequent to the first immersion in liquid cryogen 36, the articles pass through freezer zone 38 wherein the articles, in contact with cryogen vapor, are permitted to partially equilibriate in temperature. Heat is permitted to pass from the central body of the article toward the outer crust frozen surface of the article. It is desirable not to have the outer frozen crust thaw, because re-thawing permits dehydration of the article and typically results in structural damage. Thus, vaporized cryogen generated by boiling of the liquid cryogen in immersion bath 34 and in spray contacting area 40 is circulated through countercurrent zone 38 by external circulation blower 42, to utilize additional cooling capacity remaining in the vaporized cryogenic media and to help prevent thawing of the crust frozen surface as the center of the article transfers heat toward the outer surface of the article. Internal baffles 44 can be used in countercurrent zone 38 to direct the cryogen vapors in a serpentine pattern through conveyor belt 32, so that the upper and lower surface of the articles are more evenly cooled while avoiding the thermally harmful backmixing effect which can occur when fans are used. The serpentine pattern of cryogen vapor movement is the most efficient in terms of heat transfer, since there is no back mixing of the vapor which would result in a lower $\Delta T$ and reduce the heat transfer driving force. There may be cases when, due to the tunnel length, it is necessary to add a limited number of fans to assist cryogen vapor movement, but it is preferable to limit the number of internal fans used. Although the preferred embodiments of the present invention shown in FIGS. 2 and 3 show an arcuate configuration for internal baffles 44 and 86, respectively, any other configuration which accomplishes the same effect can be used. It is possible to have a cocurrent cryogen vapor contact zone between liquid immersion bath 34 and countercurrent zone 38 if desired.

Subsequent to passing through countercurrent zone 38 in which the articles are allowed to transfer heat from their center out through the frozen crust, the articles are passed through a liquid cryogen spray contacting area or means 40. Substantially all of the additional amount of cooling necessary to provide an article which is at equilibrium throughout at a temperature of about 0° F. ($-18°$ C.) or less is applied in spray contact zone 46. The spray contact zone 46 is followed by an equalization zone 48 in which the article is allowed to essentially reach temperature equilibrium. Baffles can be used at positions 50, 52, and 54 to direct cryogen vapors. Cryogen vapors from spray contact zone 40 can be prevented from flowing into equalization zone 48 by baffle 54 and from flowing into countercurrent zone 38 by baffle 52, so that these vapors feed into circulation blower 42 from entry conduit 56. Cryogen vapors from immersion bath 34 can be prevented from flowing into countercurrent zone 38 by baffle 50. If it is desired to do more surface cooling of the articles in equalization zone 48, baffle 54 can be removed, and the entry conduit 56 to circulation blower 42 can be placed in equalization zone 48, thus creating a cocurrent flow of cryogen vapor in equalization zone 48. Numerous such variations can be made within the freezer embodiment depicted in FIG. 2 while remaining within the scope of the present invention. Devices known in the art can be used to provide adjustable opening sizes at the entry to and exit from the freezer. Once the frozen articles are dropped off conveyor belt 32, the conveyor belt returns via a return chamber 58 which is located at the bottom of freezer 30, in a position which does not interfere with the circulation of cryogen vapor in countercurrent zone 38. Cryogen vapors exiting through exhaust 60 can be used for pre cooling hot or warm articles prior to their entry to the freezer or can be disposed of in an appropriate manner if the temperature of the vapors is such that no significant cooling capability remains.

Due to the difficulties in obtaining an even application of spray to the entire surface of the article being frozen, the most preferred method of application of the liquid cryogen is by immersion. Uneven cooling in spray contact zone 46 can be reduced using a combination of immersion and spray application of the liquid cryogen, wherein the article is sprayed, and wherein residual liquid cryogen from the spray is collected, and added to supplemental liquid cryogen if necessary, in an immersion tray 62 beneath the article through which the lower portion of the article passes. In FIG. 2, catch tray 62 is used to collect unvaporized liquid cryogen, providing a surface from which the liquid cryogen can vaporize for use in countercurrent zone 38. It is possible to lower conveyor belt 32 in the area of catch tray 62, permitting catch tray 62 to function at least partially as an immersion bath, thus providing cooling to the bottom portion of the article being sprayed.

FIG. 3 depicts a second preferred embodiment of the present invention, wherein the article to be frozen is first immersed in a liquid cryogen bath, followed by exposure to countercurrently flowing cryogen vapors during a temperature equalization residence time, followed by immersion in a second bath of liquid cryogen. The articles to be frozen enter the freezer 70 on conveyor belt 72 and are passed into a first immersion bath 74 of liquid cryogen 76, in immersion zone 78. The length of time the articles spend on conveyor 72 prior to entering immersion bath 74 depends on the amount of pre-cooling desired. Typically the amount of pre-cooling is minimal and depends on the article being frozen and its entrance temperature.

Subsequent to the first immersion in liquid cryogen 76, the articles pass through a freezer zone 80 wherein the articles contact cryogen vapor and are permitted to partially equilibrate in temperature. Heat is permitted to pass from the central body of the article toward the outer crust-frozen surface of the article. For purposes of improving freezer efficiency and preventing thawing of the crust-frozen surface of articles, vaporized cryogen generated by the boiling of liquid cryogen in immersion baths 74 and 82 is circulated countercurrently through zone 80, assisted by circulation blower 84. Internal baffles 86 can be used in freezer zone 80 to direct the cryogen vapors in a serpentine pattern through conveyor 72. It is possible to have a cocurrent cryogen vapor contact zone between liquid immersion bath 74 and freezer zone 80 if desired.

Subsequent to passing through countercurrent zone 80, the articles are passed through a second liquid cryogen immersion bath 82. Substantially all of the additional amount of cooling necessary to provide an article at the final desired equilibrium temperature throughout is applied in second immersion bath 82. It is possible to have more than two immersion baths within the freezer, with temperature equilibriating freezer residence zones between baths. Equipment costs and the need to control the lowest temperature the article surface experiences during crust freezing are the determining factors in establishing the number of immersion baths to be used. Second immersion bath zone 88 is followed by a temperature equalization zone 90 in which the articles are allowed to essentially reach temperature equilibrium. Baffles can be used at positions 92, 94, and 96 to direct cryogen vapors in a manner similar to that described regarding FIG. 2. Once the frozen articles are dropped off conveyor belt 72, the conveyor belt returns via chamber 98 which is located at the bottom of freezer 70. Cryogen vapors exiting through exhaust 100 can be used for pre cooling articles prior to their entry to the freezer or can be disposed of in an appropriate manner if the temperature of the vapors is such that no significant cooling capability remains.

There are, of course, numerous variations in the apparatus which can be used to practice the method of the present invention. The critical element in the method is the use of multiple application of liquid cryogen spaced in time so that heat from the center of the article being frozen can work its way out to or through the outer surface of the article, while simultaneously maintaining a crust frozen surface on the article.

Figure 4:
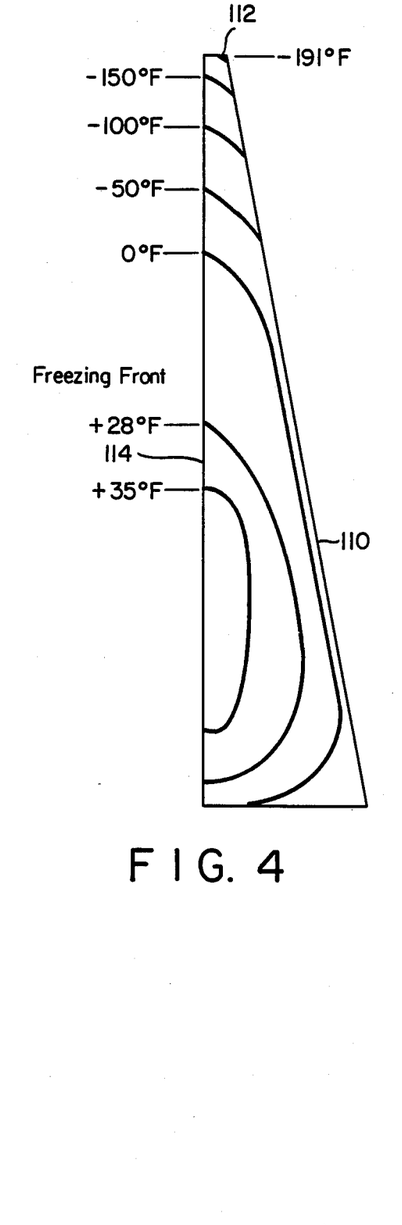
FIG. 4 shows an instantaneous cross-sectional temperature profile for a shrimp having been immersed in liquid nitrogen for about a 15 second time period, a time period typical for a prior art conventional cryogenic tunnel freezer of the type shown in FIG. 1.

To take maximum advantage of the method of the present invention, one skilled in the art should use the concept of the present invention to design the apparatus to control the article time-temperature profile during the freezing process to produce high quality frozen articles while reducing freezing costs. This can be done using computer modeling procedures and heat transfer information available within the art. For example, FIG. 4 shows an instantaneous cross-sectional temperature profile of isotherms for a section through an idealized shrimp 110, represented by a truncated cone, that had been immersed in liquid nitrogen for about a 15 second time period, a time period typical for operation of a conventional cryogenic tunnel freezer of the type shown in FIG. 1. The shrimp 110 at its outermost tip 112 is at a temperature of about $-191°$ F. ($-124°$ C.). The shrimp freezing isotherm, which would be located at about 114, between $+28°$ F. ($-2°$ C.) and $+35°$ F. ($2°$ C.) indicates the portion of the shrimp which remains unfrozen after the 15 second immersion. As is shown by the cross-sectional temperature profile, significant portions of the shrimp reach temperatures below $-50°$ F. ($-45°$ C.), subjecting these portions of the shrimp to thermal cracking and to embrittlement.

Figure 5:
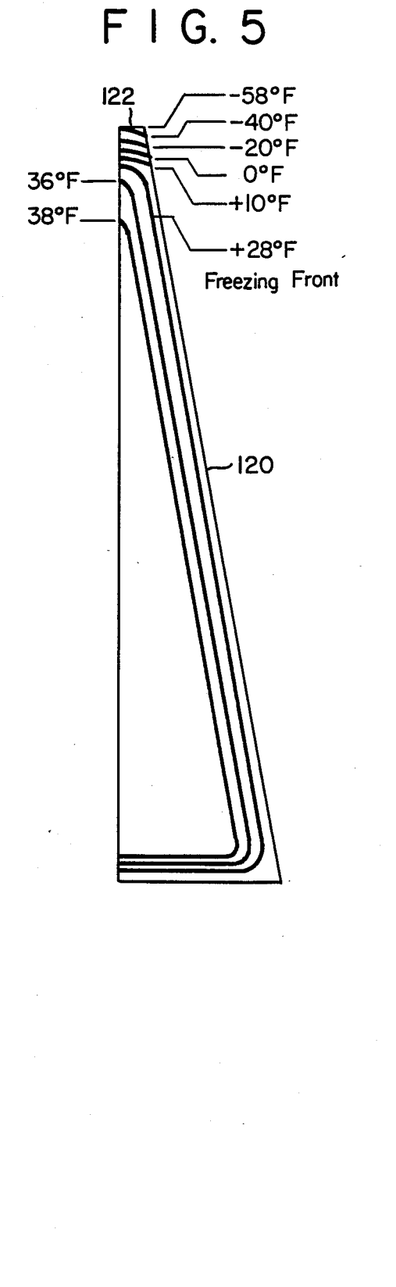
FIG. 5 shows an instantaneous cross-sectional temperature profile for a shrimp having been immersed in liquid nitrogen for about a 5 second time period, a time period typical for the first immersion bath of the apparatus of the present invention, embodiments of which are shown in FIGS. 2 and 3.

FIG. 5 shows an instantaneous cross-sectional temperature profile for a section through an idealized shrimp 120, represented by a truncated cone, that had been immersed in liquid nitrogen for about a 5 second time period, typical for the first immersion bath of the apparatus of the present invention, embodiments of which are shown in FIGS. 2 & 3. The shrimp 120 at its outermost tip 122 is at a temperature of about $-58°$ F. ($-50°$ C.). The thickness of the frozen crust comprises a much smaller portion of the shrimp, and the possibility of thermal cracking of the shrimp and embrittlement which would cause breakage of the shrimp during handling is greatly reduced. To obtain a shrimp which is frozen throughout using the shorter immersion time in liquid nitrogen, as shown in FIG. 5, requires more than one immersion, obviously with more attention to prevention of thawing of the thinner frozen crust during the temperature equalization residence period. The goal is to freeze a sufficiently deep crust that a significant amount of heat can be transferred from the interior of the article to the surface without rethawing of the surface and to freeze a sufficiently thin crust that portions of the article ar not subcooled to the point that thermal fracture occurs or that embrittlement occurs, subjecting the article to fracture and breakage upon handling during the freezing process.

Figure 6:
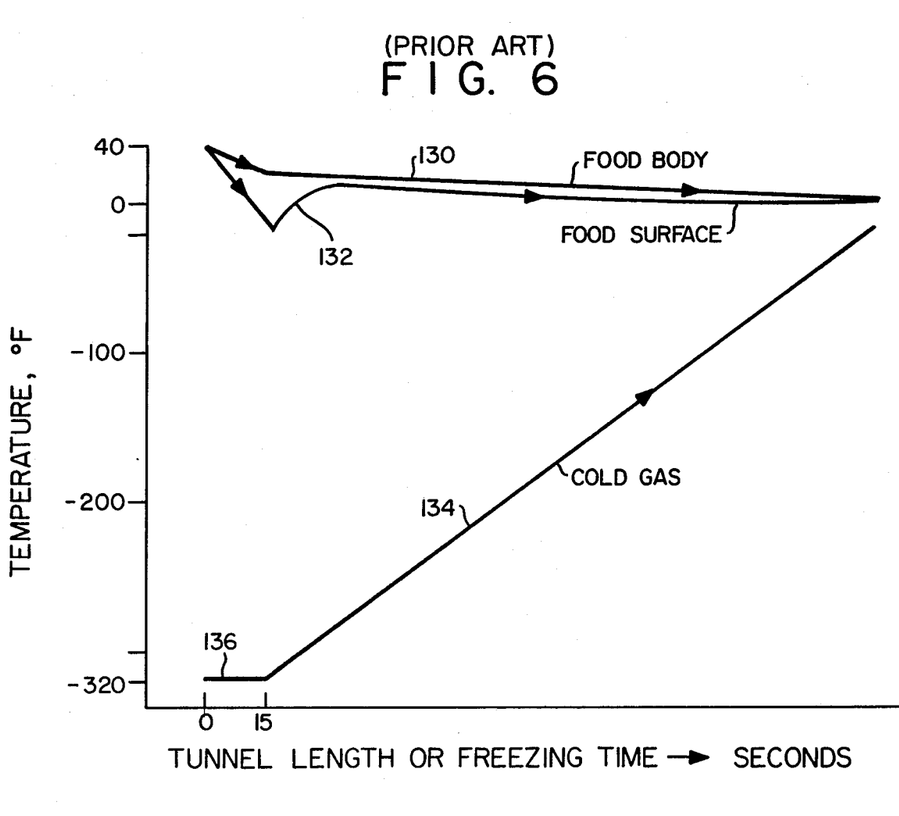
FIG. 6 shows the average body temperature of an article being frozen, a shrimp in this case, and the average surface temperature of the shrimp as a function of position of travel through a prior art conventional freezer of the type shown in FIG. 1. Also shown on FIG. 6 is the refrigerant profile as a function of position of travel through the freezer.
Figure 7:
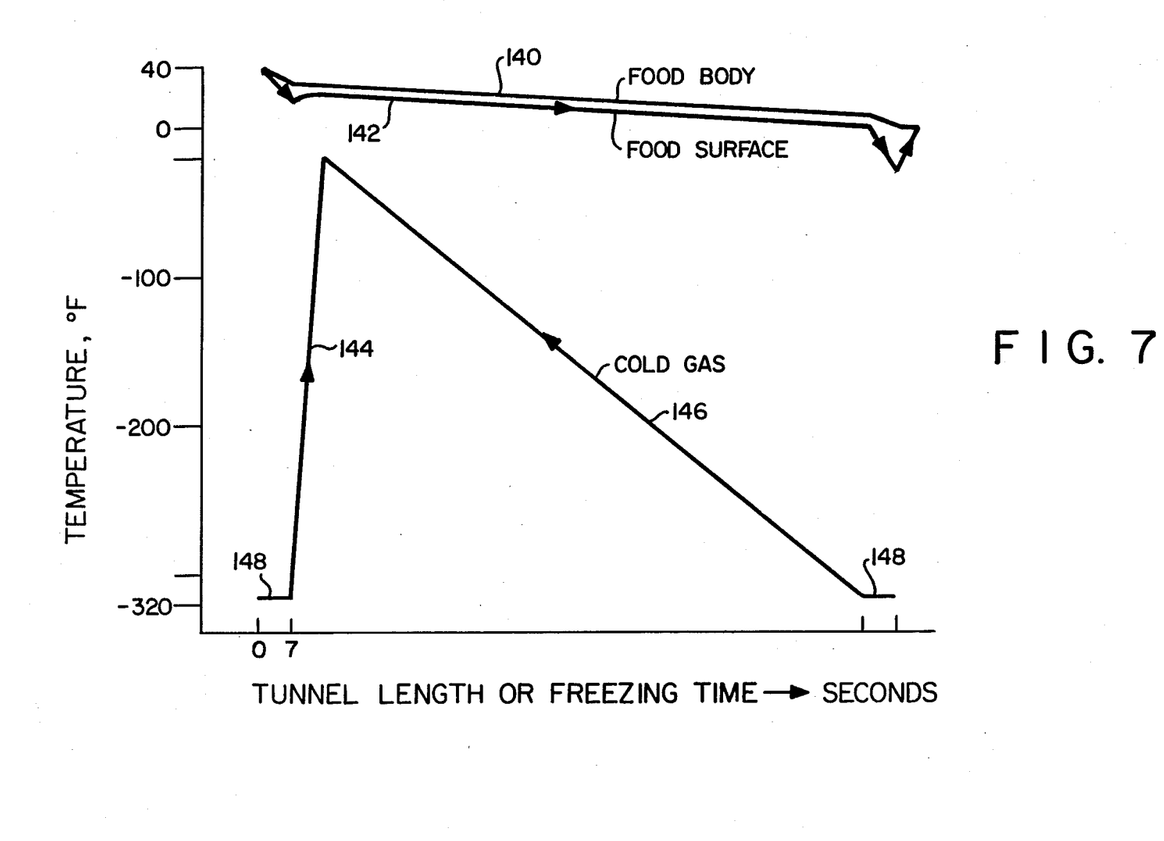
FIG. 7 shows the average body temperature of an article being frozen, a shrimp in this case, and the average surface temperature of the shrimp as a function of the position of travel through a freezer embodiment of the present invention as illustrated in FIG. 3. Also shown in FIG. 7 is the refrigerant profile as a function of the position of travel through the freezer.

It is possible to use as many liquid cryogen applications as desired, but equipment costs provide a limit in terms of diminishing return on investment. FIGS. 6 and 7 illustrate the relationship between the average temperature of the body of the article being frozen (lines 130 and 140, respectively) and the average surface temperature of the article being frozen (lines 132 and 142, respectively), as a function of the cryogen thermal profile for a prior art tunnel freezer (lines 136 and 134) and for a freezer which is an embodiment of the present invention (lines 144, 146, and 148). The article being frozen, a shrimp in the illustrations, reaches the same final equilibrium temperature at about $0°$ F. ($-18°$ C.) when either freezer is used. However, a comparison of the temperature differential ($\Delta t$) between the cryogenic medium and the shrimp average surface temperature is greater for the present invention as shown in FIG. 7 than for the prior art process shown in FIG. 6. Thus, the present invention provides a more thermally efficient freezing system. It is the use of two liquid cryogen (liquid nitrogen in this case) applications as shown in FIG. 7 at 148 instead of one liquid cryogen application as shown in FIG. 6 at 134 that provides the greater thermal differential and thus the improved thermal efficency of the system of the present invention.

The present invention provides an improvement in overall heat transfer efficiency, and thus operating cost savings. Any of the liquid cryogens known in the art can be used, depending on the desired time-temperature profile for the article being frozen; several examples of liquid cryogens have been listed previously herein, with liquid nitrogen being the preferred cryogenic media for use in many freezing applications. The presence of at least two liquid cryogen application sites with an intermediate temperature equalization site within the freezer apparatus enables the apparatus to be used to freeze articles which are significantly different in composition and shape. The amount of liquid cryogen applied at each liquid cryogen application site can be adjusted to account for such differences in articles to be frozen.

The above disclosure illustrates a typical application of both the method and the apparatus of the present invention, and presents the best mode of the invention as presently contemplated. However, this invention has a broad range of applicability and is susceptible to modification and alternate constructions based on the subject matter disclosed. Consequently, it is not intended that the above-described embodiments place narrow limitations on this invention. On the contrary, the intent is to include all modifications and alternate constructions falling within the spirit and scope of the invention as expressed in the appended claims.

Claims:

1. A method of controlling the depth of crust freezing of an organic comprised article processed in a cryogenic freezer, said method comprising:
   (a) contacting at least a portion of the surface of an organic comprised article to be frozen with a liquid cryogen to form a frozen crust on the surface of said article, wherein the thickness of said crust formed is sufficient to permit transfer of a substantial amount of heat from within the interior of said article while maintaining at least a portion of said frozen crust adequate to act as a water conduction or transmission barrier, and wherein the thickness of said crust formed is limited to prevent thermal fracture of or physical damage to said article and such that portions of said article having cross-sections which are relatively small compared with the largest cross-sectional dimension of said article do not become brittle and subject to fracture and damage during the freezing of said article;
   (b) removing said article from contact with said liquid cryogen for a residence time period sufficient to permit heat transfer from the interior of said article, while at the same time maintaining at least a portion of said frozen crust on the surface of said article adequate to function as a water conduction or transmission barrier; and
   (c) repeating step (a) at least once subsequent to step (b) during the freezing of said article.

2. The method of claim 1, wherein at least one of said contacts between said liquid cryogen and said organic comprised article is by immersion of said article in said liquid cryogen.

3. The method of claim 2 wherein the first of said contacts between said liquid cryogen and said organic comprised article is by immersion of said article in said liquid cryogen.

4. The method of claim 1 wherein said organic comprised article is contacted with cryogen vapors during at least one of said step (b) heat transfer time periods.

5. The method of claim 4 wherein the direction of the major portion of cryogen vapor flow relative to the general direction of movement of said organic comprised article through said freezer is countercurrent.

6. The method of claim 5 wherein the pattern of flow of said major portion of cryogen vapors is serpentine so that said organic comprised articles are substantially uniformly contacted by said cryogen vapors.

7. An apparatus for cryogenic freezing of an organic comprised article, said apparatus comprising:
   (a) a tunnel shaped enclosure within which an organic comprised article is frozen;
   (b) at least one means for conveying said organic comprised article through said tunnel shaped enclosure;
   (c) at least two means for contacting said organic comprised article with liquid cryogen, wherein the first one of said at least two means is positioned so that said organic comprised article contacts said liquid cryogen prior to being subjected to cryogen vapors capable of dehydrating said organic comprised article; and,
   (d) at least one means within said tunnel-shaped enclosure for providing substantial residence time within said tunnel shaped enclosure during which said organic comprised article is not in contact with liquid cryogen and during which heat transfer from the interior of said article toward the surface of said article can occur, the means for providing said substantial residence time being interdisposed between two of the at least two means for contacting said organic comprised article with liquid cryogen.

8. The apparatus of claim 7, wherein a residence time providing means is located subsequent to said first means for contacting said organic comprised article with liquid cryogen and prior to any additional means for contacting said article with liquid cryogen.

9. The apparatus of claim 7, wherein said means for providing said residence time includes means for contacting said organic comprised article with cryogen vapor.

10. The apparatus of claim 9, wherein said cryogen vapor is supplied from at least one of said means for contacting said article with liquid cryogen, said contacting means being in communication with said residence time means.

11. The apparatus of claim 9, wherein a mechanical means is used to assist in moving said cryogen vapor from said at least one of said means for contacting said article with liquid cryogen to said residence time means.

12. The apparatus of claim 10, wherein cusp shaped baffles are used to direct said cryogen vapors into a serpentine flow pattern within the portion of said tunnel-shaped enclosure in which said residence time means is located, whereby said organic comprised article is substantially uniformly contacted by said cryogen vapors.

* * * * *